US010853762B2

(12) United States Patent
Bartell et al.

(10) Patent No.: US 10,853,762 B2
(45) Date of Patent: Dec. 1, 2020

(54) GLOBAL MONITORING SYSTEM FOR CRITICAL EQUIPMENT PERFORMANCE EVALUATION

(71) Applicant: CONOCOPHILLIPS COMPANY, Houston, TX (US)

(72) Inventors: Stephen T. Bartell, Houston, TX (US); Gary A. Richardson, Darwin (AU); Carl J. Rydland, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 602 days.

(21) Appl. No.: 15/274,655

(22) Filed: Sep. 23, 2016

(65) Prior Publication Data
US 2017/0083855 A1 Mar. 23, 2017

Related U.S. Application Data

(60) Provisional application No. 62/222,561, filed on Sep. 23, 2015.

(51) Int. Cl.
*G06Q 10/00* (2012.01)
*G06Q 10/08* (2012.01)
*H04L 29/08* (2006.01)

(52) U.S. Cl.
CPC ........... *G06Q 10/087* (2013.01); *H04L 67/12* (2013.01)

(58) Field of Classification Search
CPC ....... G06Q 10/087; G06Q 10/06; G05B 23/02
USPC .................................................... 705/28, 51
See application file for complete search history.

(56) References Cited

U.S. PATENT DOCUMENTS

| | | | |
|---|---|---|---|
| 2002/0077711 A1* | 6/2002 | Nixon | C10G 11/187 700/51 |
| 2012/0043081 A1 | 2/2012 | Kjorholt | |
| 2012/0290104 A1* | 11/2012 | Holt | G06Q 10/00 700/29 |
| 2013/0124465 A1* | 5/2013 | Pingel | G06F 3/0604 707/610 |
| 2014/0358601 A1* | 12/2014 | Smiley | G06Q 10/0635 705/7.11 |
| 2015/0000294 A1 | 1/2015 | Minto et al. | |
| 2015/0053419 A1 | 2/2015 | Garcia et al. | |
| 2015/0185718 A1 | 7/2015 | Tappan et al. | |

FOREIGN PATENT DOCUMENTS

| | | | | |
|---|---|---|---|---|
| CN | 204386576 U | 6/2015 | | |
| EP | 0681549 B1 * | 10/1996 | ............ | G01S 17/74 |
| WO | 2015000065 A1 | 1/2015 | | |

OTHER PUBLICATIONS

International Search Report for related case, App. No. PCT/US2016/053541, dated Nov. 23, 2016.

(Continued)

*Primary Examiner* — Rokib Masud
(74) *Attorney, Agent, or Firm* — Polsinelli PC

(57) ABSTRACT

Acquiring and evaluating data regarding the performance of critical equipment of various business units distributed around the globe is essential in today's market. In particular aggregating, organizing and evaluating various types of data at a host processing system that is accessible via an intuitive graphical user interface to approved users connected to an enterprise network.

18 Claims, 6 Drawing Sheets

(56) References Cited

OTHER PUBLICATIONS

Fortino, Giancarlo, et al—"Internet of Things Based on Smart Objects: Technology, Middleware and Applications", 2014, (Book) Springer XP055480076; 1 pg. Abstract only.

Colombo, Armando, et al—"Industrial Cloud-Based Cyber-Physical Systems: the IMC-AESOP Approach", 2014, (Book) Springer XP055480251; 1 pg. Abstract only.

Tse, Peter W., et al—"Web and virtual instrument based machine remote sensing, monitoring and fault diagnostic system", 2001, ASME 2001 Developing Web-based manufacturing systems Design Engineering Technical conferences and Computers and Information in Engineering Conference, XP055063420; 9 pgs.

Schmaus, Robert—"Early detection of machinery failures using online Condition Monitoring Systems (CMS)", 2013, Pruftechnik Middle East Dubai, XP055480148; 126 pgs.

O'Brien, Thomas F., et al—"Handbook of Chlor-Alkali Technology, vol. 1: Fundamentals", 2005, Springer; 6 pgs.

\* cited by examiner

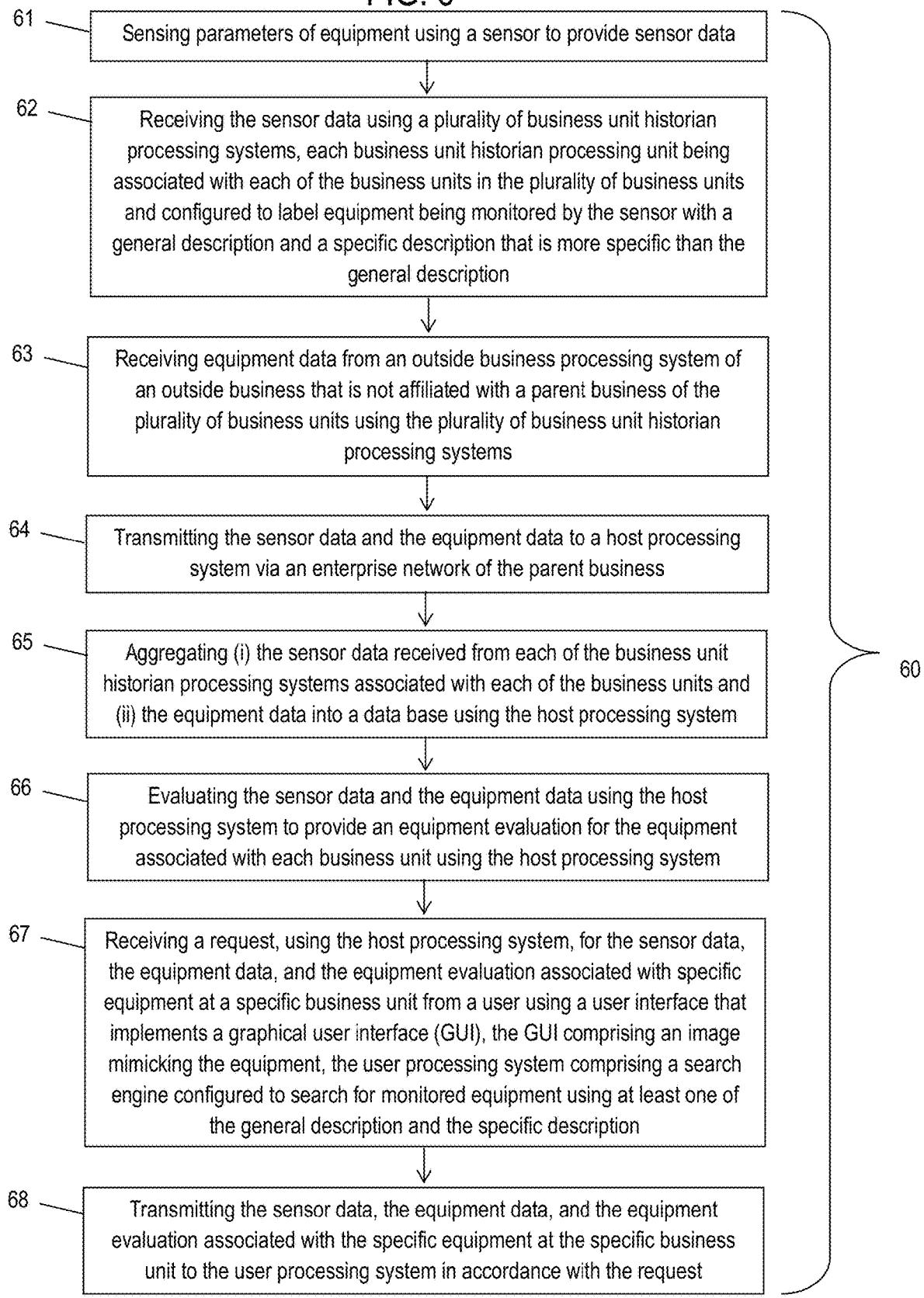

GLOBAL MONITORING SYSTEM FOR CRITICAL EQUIPMENT PERFORMANCE EVALUATION

CROSS-REFERENCE TO RELATED APPLICATIONS

This application is a non-provisional application which claims benefit under 35 USC § 119(e) to U.S. Provisional Application Ser. No. 62/222,561 filed Sep. 23, 2015, entitled "GLOBAL MONITORING SYSTEM FOR CRITICAL EQUIPMENT PERFORMANCE EVALUATION," which is incorporated herein in its entirety.

FIELD OF THE INVENTION

This invention relates to apparatus and method for acquiring and evaluating data regarding the performance of critical equipment of various business units distributed around the globe. In particular, the invention concerns aggregating, organizing and evaluating various types of data at a host processing system that is accessible via an intuitive graphical user interface to approved users connected to an enterprise network.

BACKGROUND OF THE INVENTION

Large businesses may include various business units based around the globe. Some or all of the business units may operate equipment and systems that are economically vital or critical to the parent business. Sudden unexpected shutdown of such equipment and associated systems may prove to be detrimental to the parent business. Hence, parent businesses would appreciate developments in apparatus and methods that would prevent or limit unplanned shutdowns of critical equipment.

SUMMARY OF THE INVENTION

An method for aggregating and evaluating data of equipment operated by a plurality of business units, the method comprising: sensing parameters of the equipment using a sensor to provide sensor data; receiving the sensor data using a plurality of business unit historian processing systems, each business unit historian processing unit being associated with each of the business units in the plurality of business units and configured to label equipment being monitored by the sensor with a general description and a specific description that is more specific than the general description; transmitting the sensor data to a host processing system via an enterprise network of a parent business of the plurality of business units; transmitting equipment data from an outside business processing system of an outside business that is not affiliated with the parent business to the host processing system via the enterprise network; aggregating (i) the sensor data received from each of the business unit historian processing systems associated with each of the business units and (ii) the equipment data into a data base using the host processing system; evaluating the sensor data and the equipment data using the host processing system to provide an equipment evaluation for the equipment associated with each business unit using the host processing system; receiving a request, using the host processing system, for the sensor data, the equipment data, and the equipment evaluation associated with specific equipment at a specific business unit from a user using a user interface that implements a graphical user interface (GUI), the GUI comprising an image mimicking the equipment, the user processing system comprising a search engine configured to search for monitored equipment using at least one of the general description and the specific description; and transmitting the sensor data, the equipment data, and the equipment evaluation associated with the specific equipment at the specific business unit to the user processing system in accordance with the request.

A global monitoring system for aggregating and evaluating data of equipment operated by a plurality of business units, the system comprising: a plurality of sensors configured to sense parameters of the equipment to provide sensor data; a plurality of business unit historian processing systems configured to receive the sensor data, each business unit historian processing system being associated with each of the business units in the plurality of business units and configured to label equipment being monitored by the sensor with a general description and a specific description that is more specific than the general description; an enterprise network of a parent business of the plurality of business units, the enterprise network being configured to communicate with the plurality of business unit historian processing systems; a host processing system in communication with the enterprise network and configured to receive the sensor data from each of the business unit historian processing systems and equipment data from an outside processing system of an outside business that is not affiliated with the parent business; a user processing system in communication with the host processing system via the enterprise network and comprising a graphical user interface (GUI), the GUI comprising an image mimicking the equipment, the user processing system comprising a search engine configured to search for monitored equipment using at least one of the general description and the specific description; wherein the host processing system is further configured to: aggregate (i) the sensor data received from each of the business unit historian processing systems associated with each of the business units and (ii) the equipment data into a data base; evaluate the sensor data and the equipment data to provide an equipment evaluation for the equipment associated with each business unit using the host processing system; receive a request for the sensor data, the equipment data, and the equipment evaluation associated with specific equipment at a specific business unit from a user using the user processing system; and transmit the sensor data, equipment data, and equipment evaluation associated with the specific equipment at the specific business unit to the user processing system in accordance with the request.

Sensor data may be transmitted to the outside business processing system, wherein the outside business processing system evaluates the sensor data and provides an outside equipment evaluation as the equipment data.

Evaluating includes comparing the sensor data or the equipment data to a threshold value.

Alert signals may be initiated if the sensor data or the equipment data exceed a threshold value. The alert signal may also be transmitted to the user processing system.

A work order to repair or service the equipment may be generated corresponding to the sensor data or the equipment data if the sensor data or the equipment data exceed the threshold value. Additionally, the work order may be transmitted to the business unit having the equipment corresponding to the sensor data or the equipment data. Finally, the equipment corresponding to the sensor data or the equipment data may be repaired in accordance with the work order.

Business unit historian processing systems may be updated with latest sensor data and latest equipment data in real time.

General description may include a function of the corresponding equipment and the specific description comprises a make and model of the corresponding equipment.

A search of the business unit historian processing system may be searched using the search engine in the host processing system in response to a request by a user using the user processing system.

The enterprise network may be configured to transmit the sensor data to the outside business processing system, wherein the outside business processing system evaluates the sensor data and provides an outside equipment evaluation as the equipment data.

The host processing system may be configured to compare the sensor data or the equipment data for specific equipment to a threshold value. In addition, the host processing system may be configured to initiate an alert signal if the sensor data or the equipment data for specific equipment exceeds the threshold value. The host processing system may also be configured to transmit the alert signal to the user processing system. The host processing system may initiate a work order to repair or service the specific equipment corresponding to the sensor data or the equipment data if the sensor data or the equipment data exceeds the threshold value. Finally, the host processing system may transmit the work order to the business unit having the specific equipment corresponding to the sensor data or the equipment data.

BRIEF DESCRIPTION OF THE DRAWINGS

The invention, together with further advantages thereof, may best be understood by reference to the following description taken in conjunction with the accompanying figures by way of example and not by way of limitation, in which:

FIG. 6 is a flow chart for a method for aggregating and evaluating equipment data from a plurality of distributed business units.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

Disclosed are apparatus and methods related to a global monitoring system operated by a parent business for aggregating and evaluating equipment data from a plurality of distributed business units. The global monitoring system drives improvement in the operating performance of business unit facilities through interactive decision support of their critical equipment. This monitoring system is enabled through a "host" attached to an enterprise network of the parent business, and linked to each business unit facility's data historian. The host is configured to use graphical user interfaces (GUIs) to access client services and internal reporting data bases. It enables the global monitoring system to function as a collaborative platform for the purpose of analyzing and improving facility and equipment performance.

The global monitoring system can generate facility and equipment performance indicators by processing input variables from each business unit's data historian. These indicators can display performance trends and identify value improvement opportunities for facilities and their equipment. GUI programming allows enterprise-wide web access to these indicators to promote collaboration among the business units and central functions and to leverage best practices in use by the business units.

The global monitoring system can drive increased proficiency in three fundamental areas of equipment performance assurance to address performance gaps and improve equipment operation. The three fundamental areas are: (1) anomaly recognition—identifying unusual equipment operation to understand and mitigate potential failure modes; (2) performance analysis—modeling equipment operation in comparison to its nameplate capacity to diagnose and characterize performance degradation; and (3) condition monitoring—field verification of critical indicators in comparison to established limits of reliable operation.

Further, the global monitoring system can access in-house systems and commercially-available client services performed by outside businesses for collaborative viewing and interaction through global monitoring to drive proficiency in each of the three fundamental areas in the business units' systems.

Figure 1A:
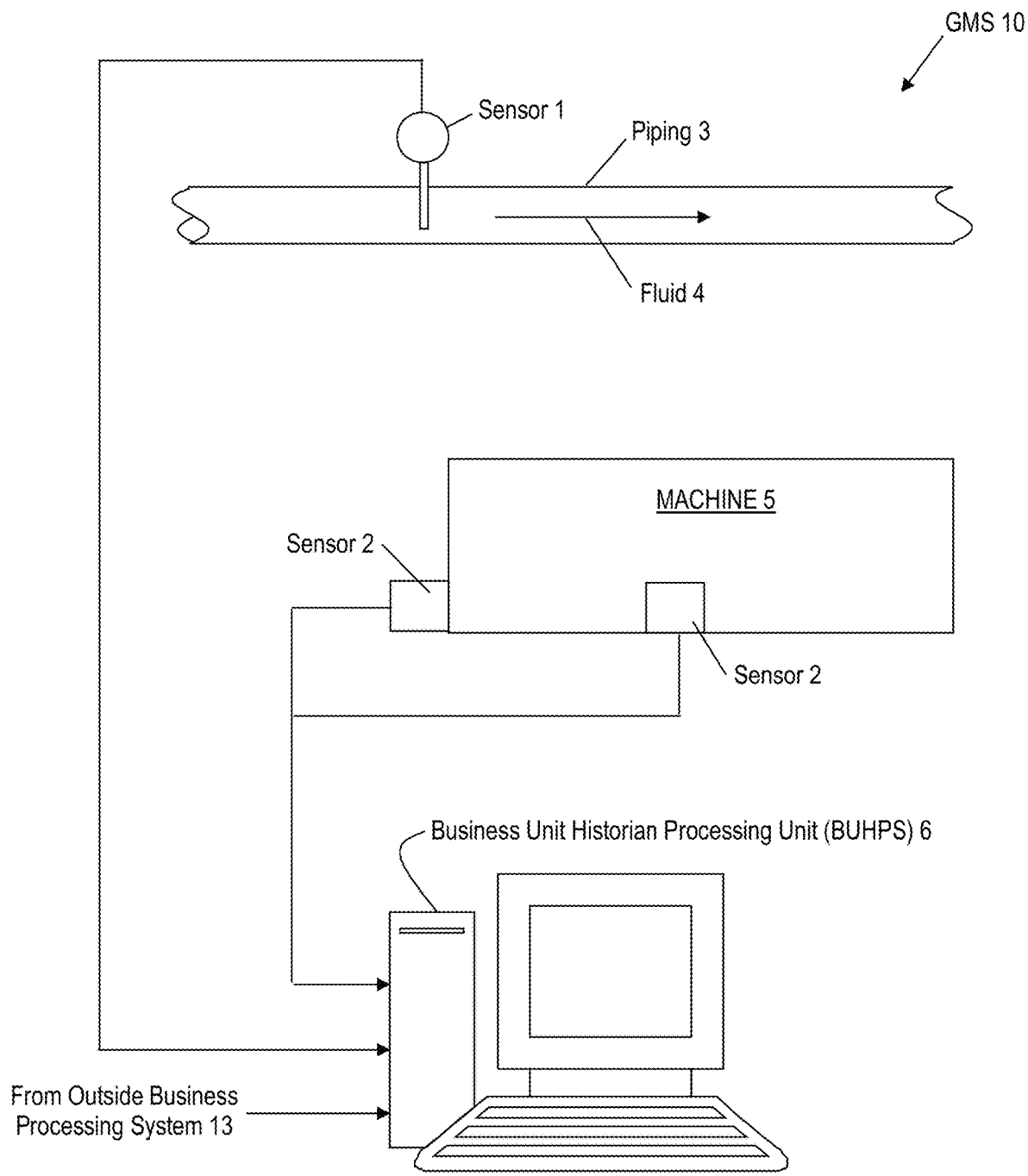
FIGS. 1A and 1B, collectively referred to as FIG. 1, depict aspects of a global monitoring system operated by a parent business.

Turning now to FIG. 1, aspects of a global monitoring system 10 operated by a patent business are depicted. In FIG. 1A, a simplified drawing of a monitored process and a monitored machine is presented. A first sensor 1 is coupled to process piping 3 for monitoring a fluid 4 disposed in the piping 3. The first sensor 1 is configured to sense a property of interest of the fluid 4. Non-limiting embodiments of the sensed property include temperature, pressure, flow rate, density, viscosity, radiation, and chemical composition. A second sensor 2 is coupled to a machine 5 for monitoring a property of the machine 5. Non-limiting embodiments of the sensed property of the machine 5 include mechanical properties such as temperature, vibration or acceleration, oil level, coolant level, speed, and/or electrical properties such as current and voltage. Sensed property values from the first sensor 1 and the second sensor 2 are transmitted to a processing system 6 at the business unit (BU) level referred to as the business unit historian processing system (BUHPS) 6. At the BUHPS 6, the sensed property values are stored along with a time at which the sensed values were received. It can be appreciated that the sensed property values may be transmitted in real time (e.g., as soon as the measurement is performed) to the BUHPS 6. The BUHPS 6 may also label sensed data with a general description, such as compressor or pump for example, and a specific description, such as make and model of the equipment being monitored. In general, the specific description contains more specific detail regarding the monitored equipment than the general description. This enables various levels of searches to suit the requirements of a user.

Figure 1B:
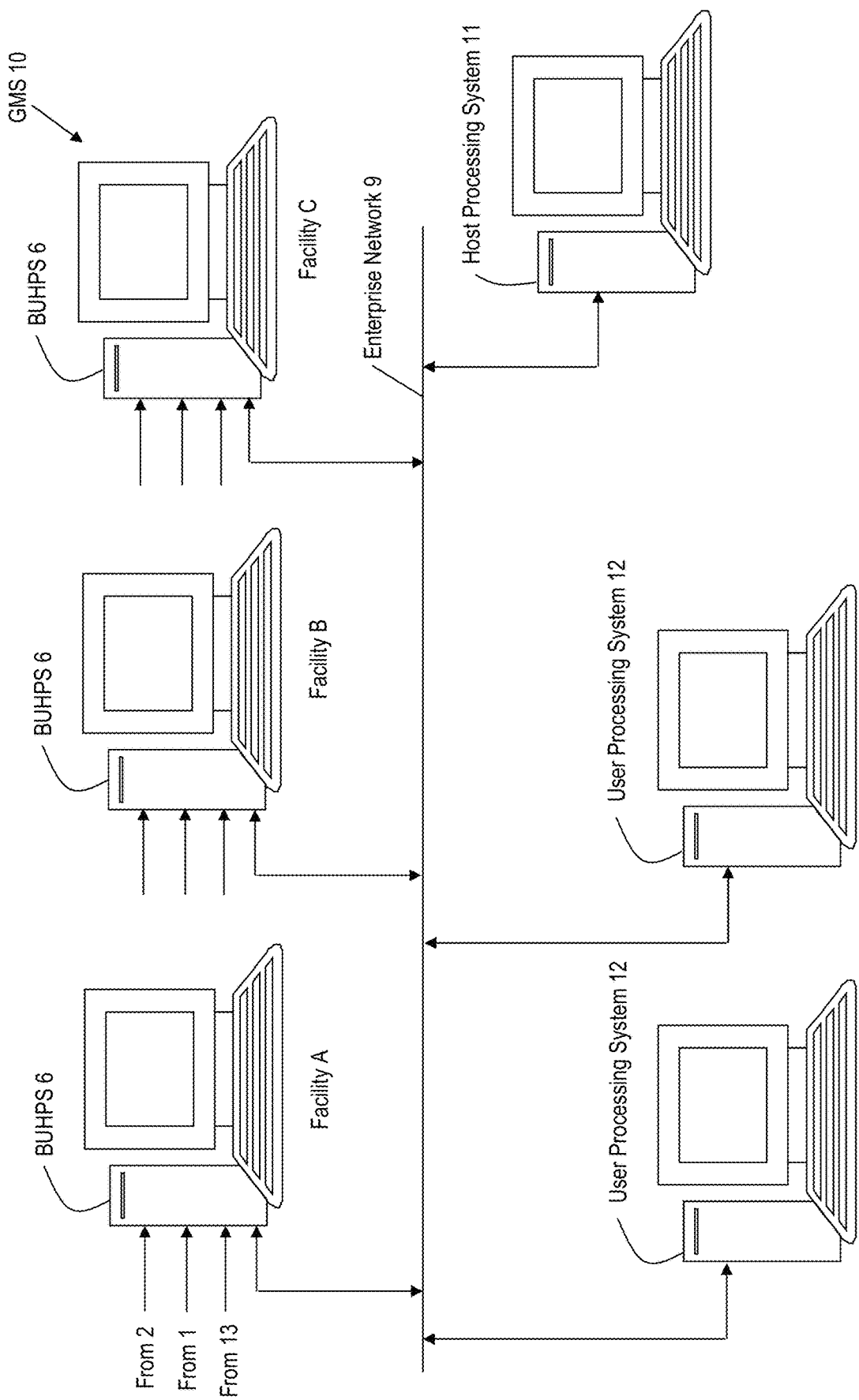

In FIG. 1B, three BUHPS's are illustrated for teaching purposes, the BUHPS 6 illustrated in FIG. 1A and two other BUHPS's (BUHPS 7 and 8) receiving sensed property values from monitored equipment. In general, the business units associated with the BUHPS's are differentiated by their geographical location. Each of the BUHPS's is connected to an enterprise network 9. The enterprise network 9 in general is operated by the parent business of the business units. Communications with the enterprise network 9 may be by way of the Internet, a parent business intranet, hardwire, telephone line, radio or any other ways known in the art. Also connected to the enterprise network 9 is a host processing system 11 and a plurality of user processing systems 12. The host processing system 11 is configured to retrieve data from each of the BUHPS's. In addition, the host processing system is configured to receive data from an outside business processing system 13 operated by an outside business to evaluate specific processes and machines at specific business units. In general, the outside business is not part of or affiliated with the parent business and may perform "client services" using proprietary algorithms or techniques under contract to the parent business or one of the business units. In one or more embodiments, the outside business may communicate with the host processing system using the Internet. Further, the host processing system is configured to evaluate sensor data such as by comparing the sensor data to a threshold level, setpoint, or range of values. The threshold level, setpoint, or range of values may be determined by experience, by an equipment manufacturer or by an algorithm modeling the operation of a process or machine. Further, the host processing system may be configured to evaluate any data or evaluations received from the outside business. In response to any evaluation, the host processing system may be configured to send an alert signal to users of the business unit having the process or machine of interest or other users entered into the host processing system as having an interest in the process or machine associated with the evaluation. In one or more embodiments in response to any evaluation, the host processing system may be configured to send a work order authorizing repair or servicing of the process or machine associated with the evaluation.

Figure 2:
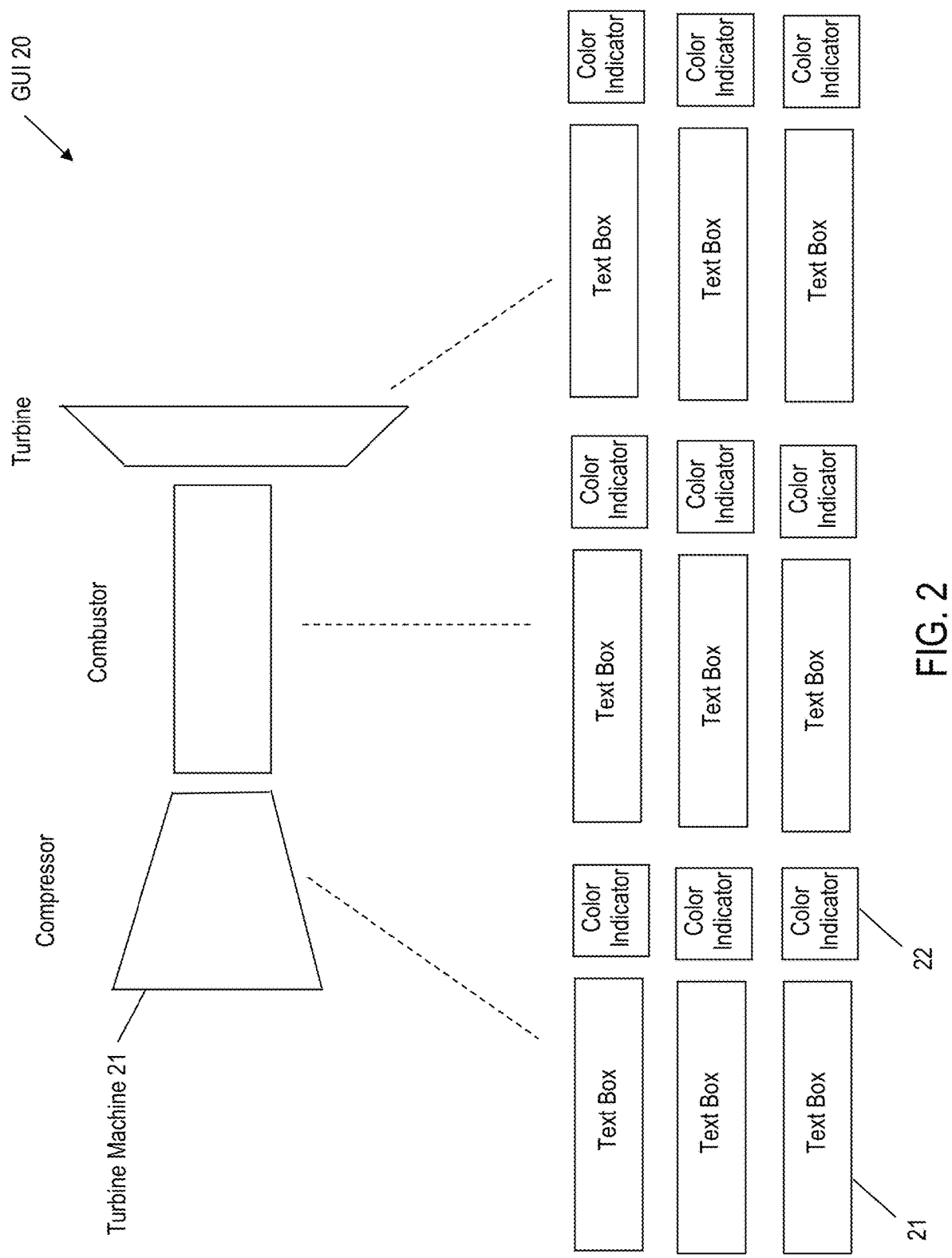
FIG. 2 depicts aspects of one embodiment of a graphical user interface.

Each user processing system 12 is configured to query the host processing system 11 to request sensor values or information concerning a specific process or machine at a specific business unit. In one or more embodiments, each user processing system 12 includes a search engine to perform queries. The information may include evaluations performed by the host processing system or data or evaluations performed by an outside business. Each user processing system may include a graphical user interface (GUI) to aid the user in requesting sensor values or information of interest. In one or more embodiments, the GUI provides an image that mimics the process or machine of interest with text boxes for providing data associated with a portion of interest. FIG. 2 illustrates one example of a GUI 20 for a turbine machine 21. The GUI includes text boxes 22 for displaying a label identifying the machine being monitored, data values, and units of the data values. In general, the text boxes 22 are located in the vicinity of or connected to the portion on interest of the process or machine to which the data corresponds. In one or more embodiments, a color indicator 23 is associated with each text box 22. The color indicator 23 is configured to display a color corresponding to a status of the current data in the text box 22. In one or more embodiments, the colors are green for normal values of the data, yellow for data values in a caution zone, and red for data values in a zone of concern. It can be appreciated that other colors may also be used for these or other purposes.

Figure 3:
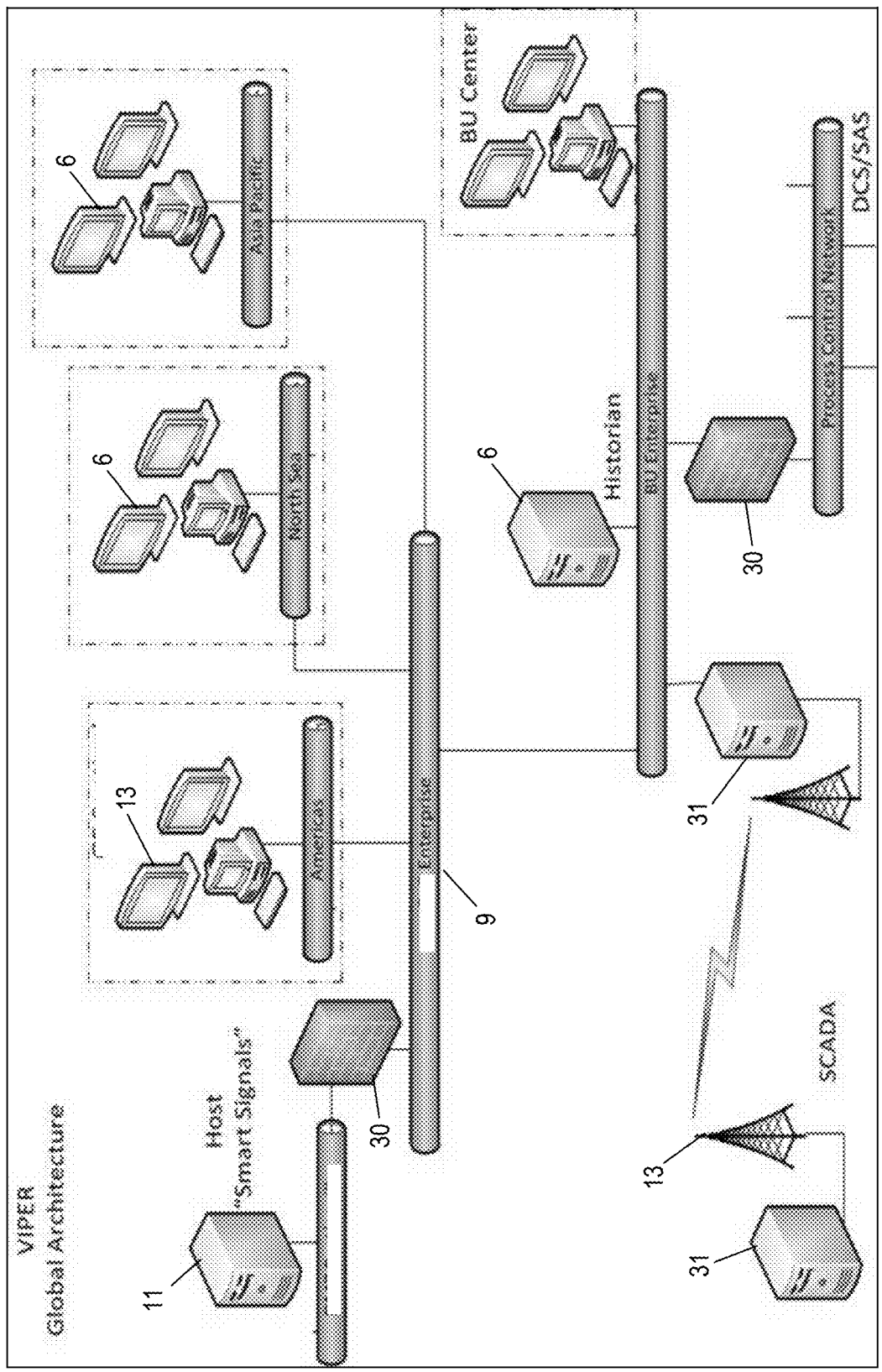
FIG. 3 depicts aspects of one embodiment of the global monitoring system.

FIG. 3 depicts aspects of another embodiment of the global monitoring system 10. In the embodiment of FIG. 3, a firewall 30 is disposed between the host processing system and the enterprise network. Similarly, the firewall 30 is disposed between a business unit historian processing system and a business unit enterprise network. Users at the business unit level can access the BUHPS or the host processing system via the business unit enterprise network. Also illustrated in FIG. 3 is a supervisory control and data acquisition (SADA) system 31 for providing sensor data to a BUHPS. The SCADA system in the embodiment of FIG. 3 includes a radio communication system 32.

Figure 4:
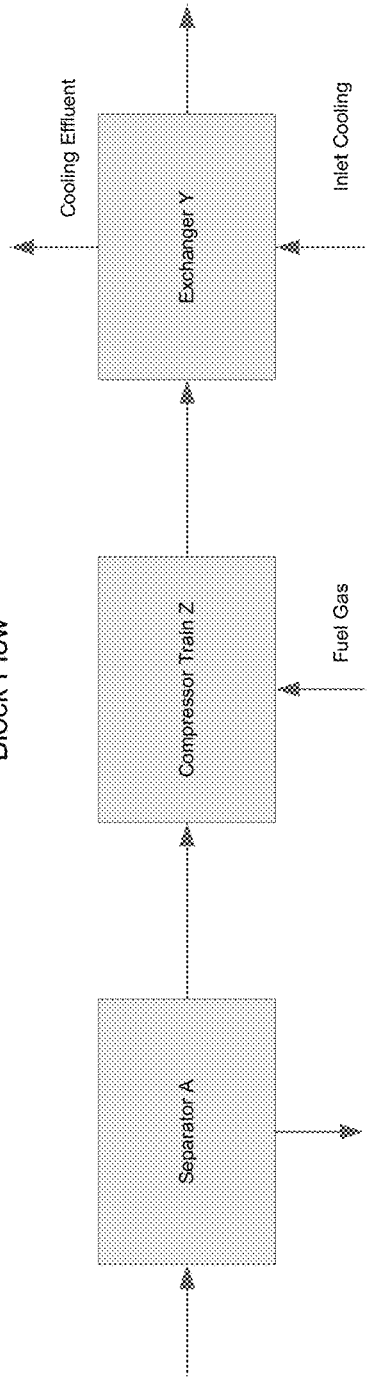
FIG. 4 is a block flow diagram of one embodiment of a process monitored by the global monitoring system.
Figure 5:
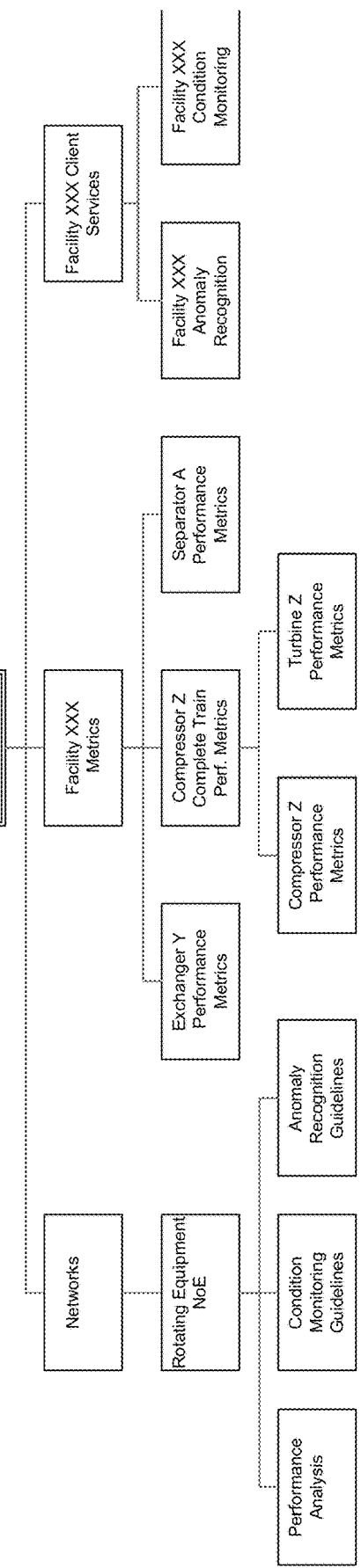
FIG. 5 is a flow chart depicting aspects of various functions of the global monitoring system.

FIG. 4 is a block flow diagram of one embodiment of a process 40 at Facility XXX monitored by the global monitoring system 10. The process 40 includes a Separator A that supplies fluid to a Compressor Train Z that in turn provides a fluid to Exchanger Y. Process sensors 8 and machine sensors 9 are used to monitor the process 40. FIG. 5 is a chart depicting aspects of various functions of the global monitoring system (GMS) 10 for monitoring the process 40 illustrated in FIG. 4. In the embodiment of FIG. 5, the GMS 10 performs a performance analysis of various rotating equipment for all of the business units connected to the enterprise network using condition monitoring guidelines and anomaly recognition guidelines. The GMS 10 in FIG. 5 also monitors the metrics of Facility XXX to include Exchanger Y performance metrics, Compressor Z train performance metrics to include Compressor Z and Turbine Z (not shown) performance metrics.

Turning now to FIG. 6, a flow chart for one example of a method 60 for aggregating and evaluating data of equipment operated by a plurality of business units is presented. Block 61 calls for sensing parameters of the equipment using a sensor to provide sensor data. Block 62 calls for receiving the sensor data using a plurality of business unit historian processing systems, each business unit historian processing unit being associated with each of the business units in the plurality of business units and configured to label equipment being monitored by the sensor with a general description and a specific description that is more specific than the general description. In one or more embodiments, the general description includes a function of the monitored equipment and the specific description includes a make and model of the monitored equipment. Block 63 calls for receiving equipment data from an outside business processing system of an outside business that is not affiliated with a parent business of the plurality of business units using the plurality of business unit historian processing systems. In one or more embodiments, each of the business unit historian processing systems is updated with latest sensor data and latest equipment data in real time. Block 64 calls for transmitting the sensor data and the equipment data to a host processing system via an enterprise network of the parent business. Block 65 calls for aggregating (i) the sensor data received from each of the business unit historian processing systems associated with each of the business units and (ii) the equipment data into a data base using the host processing system. Block 66 calls for evaluating the sensor data and the equipment data using the host processing system to provide an equipment evaluation for the equipment associated with each business unit using the host processing system. Evaluating may include comparing the equipment data or the other equipment data to a threshold value or a range of reference values. Block 67 calls for receiving a request, using the host processing system, for the sensor data, the equipment data, and the equipment evaluation associated with specific equipment at a specific business unit from a user using a user interface that implements a graphical user interface (GUI), the GUI comprising an image mimicking the equipment, the user processing system comprising a search engine configured to search for monitored equipment using at least one of the general description and the specific description. Block 68 calls for transmitting the sensor data, the equipment data, and the equipment evaluation associated with the specific equipment at the specific business unit to the user processing system in accordance with the request.

The method 60 may further include transmitting the sensor data to the outside business processing system, wherein the outside business processing system evaluates the sensor data and provides an outside equipment evaluation as the equipment data. The method 60 may further include initiating an alert signal if the sensor data or the equipment data exceed the threshold value. The method 60 may further include transmitting the alert signal to the user interface. The method 60 may further include initiating a work order to repair or service the equipment corresponding to the sensor data or the equipment data if the sensor data or the equipment data exceed the threshold value. The method 60 may further include transmitting the work order to the business unit having the equipment corresponding to the sensor data or the equipment data. The method 60 may further include repairing or servicing the equipment corresponding to the sensor data or the equipment data in accordance with the work order. The method 60 may further include performing a search of the business unit historian processing system using the search engine in the host processing system in response to a request by a user using the user processing system.

In support of the teachings herein, various analysis components may be used, including a digital and/or analog system. For example, the first sensor 1, the second sensor 2, the business unit historian processing systems 6, the enterprise network 9, the host processing system 11, the user processing systems 12, and/or the outside business processing system 13 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of non-transitory computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "configured" relates to one or more structural limitations of a device that are required for the device to perform the function or operation for which the device is configured.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

What is claimed is:

1. A method for aggregating and evaluating data of equipment operated by a plurality of business units, the method comprising:
   sensing parameters of the equipment using a sensor to provide sensor data;
   receiving the sensor data using a plurality of business unit historian processing systems, each of the plurality of business unit historian processing systems associated with each of the plurality of business units;
   enabling searching of the equipment by labeling the equipment with a general description and a specific description, the general description shared among multiple ones of the equipment, the specific description being more specific than the general description;
   transmitting the sensor data to a host processing system via an enterprise network of a parent business of the plurality of business units;
   transmitting equipment data from an outside business processing system of an outside business that is not affiliated with the parent business to the host processing system via the enterprise network;
   aggregating the sensor data and the equipment data into a database using the host processing system;
   evaluating the sensor data and the equipment data using the host processing system to provide an equipment evaluation for the equipment;
   receiving a request, using the host processing system, for the sensor data, the equipment data, and the equipment evaluation from a user using a user interface that implements a graphical user interface (GUI), the GUI comprising at least one image representing the equipment, the user interface configured to perform a search of the equipment using at least one of the general description or the specific description; and transmitting the sensor data, the equipment data, and the equipment evaluation to the user interface in accordance with the request.

2. The method according to claim 1, further comprising:
transmitting the sensor data to the outside business processing system, the outside business processing system configured to evaluate the sensor data and provide an outside equipment evaluation of the equipment data.

3. The method according to claim 1, wherein the evaluating of the sensor data comprises comparing the sensor data or the equipment data to a threshold value.

4. The method according to claim 3, further comprising:
initiating an alert signal if the sensor data or the equipment data exceeds the threshold value.

5. The method according to claim 4, further comprising:
transmitting the alert signal to the user interface.

6. The method according to claim 3, further comprising:
initiating a work order to repair or service the equipment corresponding to the sensor data or the equipment data if the sensor data or the equipment data exceeds the threshold value.

7. The method according to claim 6, further comprising:
transmitting the work order to any one or more of the plurality of business units having the equipment corresponding to the sensor data or the equipment data.

8. The method according to claim 7, further comprising:
repairing or servicing the equipment corresponding to the sensor data or the equipment data in accordance with the work order.

9. The method according to claim 1, wherein each of the plurality of business unit historian processing systems is updated with latest sensor data and latest equipment data in real time.

10. The method according to claim 1,
wherein,
the general description comprises a function of a respective one of the equipment, and
the specific description comprises a make and a model of the respective one of the equipment.

11. The method according to claim 1, further comprising:
performing the search of the plurality of business unit historian processing systems using a search engine in the host processing system in response to the request by the user using the user interface.

12. A global monitoring system for aggregating and evaluating data of equipment operated by a plurality of business units, the system comprising:
a plurality of sensors configured to sense parameters of the equipment and provide sensor data;
a plurality of business unit historian processing systems configured to receive the sensor data, each of the plurality of business unit historian processing systems associated with each of the plurality of business units and configured to enable searching of the equipment by labeling the equipment with a general description and a specific description, the general description shared among multiple ones of the equipment, the specific description being more specific than the general description;
an enterprise network of a parent business of the plurality of business units, the enterprise network configured to communicate with the plurality of business unit historian processing systems;
a host processing system in communication with the enterprise network and configured to receive the sensor data from each of the plurality of business unit historian processing systems and equipment data from an outside processing system of an outside business that is not affiliated with the parent business; and
a user processing system in communication with the host processing system via the enterprise network, the user processing system comprising a graphical user interface (GUI), the GUI comprising at least one image representing the equipment, the user processing system configured to perform a search of the equipment using at least one of the general description or the specific description;
wherein the host processing system is further configured to:
aggregate the sensor data and the equipment data into a database;
evaluate the sensor data and the equipment data to provide an equipment evaluation for the equipment using the host processing system;
receive a request for the sensor data, the equipment data, and the equipment evaluation from a user using the user processing system; and
transmit the sensor data, equipment data, and equipment evaluation to the user processing system in accordance with the request.

13. The global monitoring system according to claim 12, wherein,
the enterprise network is further configured to transmit the sensor data to the outside processing system, and
the outside processing system is configured to evaluate the sensor data and provide an outside equipment evaluation of the equipment data.

14. The global monitoring system according to claim 12, wherein the host processing system is further configured to compare the sensor data or the equipment data for specific equipment to a threshold value.

15. The global monitoring system according to claim 14, wherein the host processing system is further configured to initiate an alert signal if the sensor data or the equipment data for specific equipment exceeds the threshold value.

16. The global monitoring system according to claim 15, wherein the host processing system is further configured to transmit the alert signal to the user processing system.

17. The global monitoring system according to claim 15, wherein the host processing system is further configured to initiate a work order to repair or service the specific equipment corresponding to the sensor data or the equipment data if the sensor data or the equipment data exceeds the threshold value.

18. The global monitoring system according to claim 17, wherein the host processing system is further configured to transmit the work order to any one or more of the plurality of business units having the specific equipment corresponding to the sensor data or the equipment data.

* * * * *